United States Patent [19]

Simpson et al.

[11] 4,367,145

[45] Jan. 4, 1983

[54] PORTABLE WATER CLARIFIER

[76] Inventors: Ellis O. Simpson, 4001 Redwood Dr., Groves, Tex. 77619; Scott O. Simpson, 509 King George Land, Port Neches, Tex. 77651; Garland E. Simpson, 2026 Ray; Tracy T. Simpson, 4001 Redwood Dr., both of Groves, Tex. 77619

[21] Appl. No.: 228,078

[22] Filed: Jan. 26, 1981

[51] Int. Cl.³ .............................................. B01D 21/02
[52] U.S. Cl. ................................. 210/241; 210/257.1; 210/532.1
[58] Field of Search ............... 210/201, 202, 241, 252, 210/257.1, 258, 259, 294, 320, 322, 532.1

[56] References Cited

U.S. PATENT DOCUMENTS 2,348,125  5/1944  Green ................................... 210/202
3,474,033  10/1969  Stout et al. ......................... 210/201
3,630,365  12/1971  Woodbridge et al. .............. 210/241

Primary Examiner—Ivars C. Cintins

Attorney, Agent, or Firm—Harvey B. Jacobson

[57] ABSTRACT

A water clarifier for removing sediment comprises four successive compartments in which settling of the sediment is provided and clarified water removed. In three of the compartments, sediment contaminated water travels through a tortuous path to cause the sediment to settle to the bottom, forming a sediment bed in which the water is filtered. Sump means are provided to remove the sediment. Substantially clear water is directed from the third compartment to the bottom of the fourth compartment, pure water is exiting the fourth compartment near the top thereof and at the end of the compartment opposite the end at which the water entered. The clarifier is mounted on an easily transportable vehicle and is capable of treating approximately 150,000 gallons of contaminated water per day in which the water to be treated can be pumped directly from its source and the clarified water leaving the fourth compartment returned, thereby substantially eliminating excessive loss of treated water.

9 Claims, 7 Drawing Figures

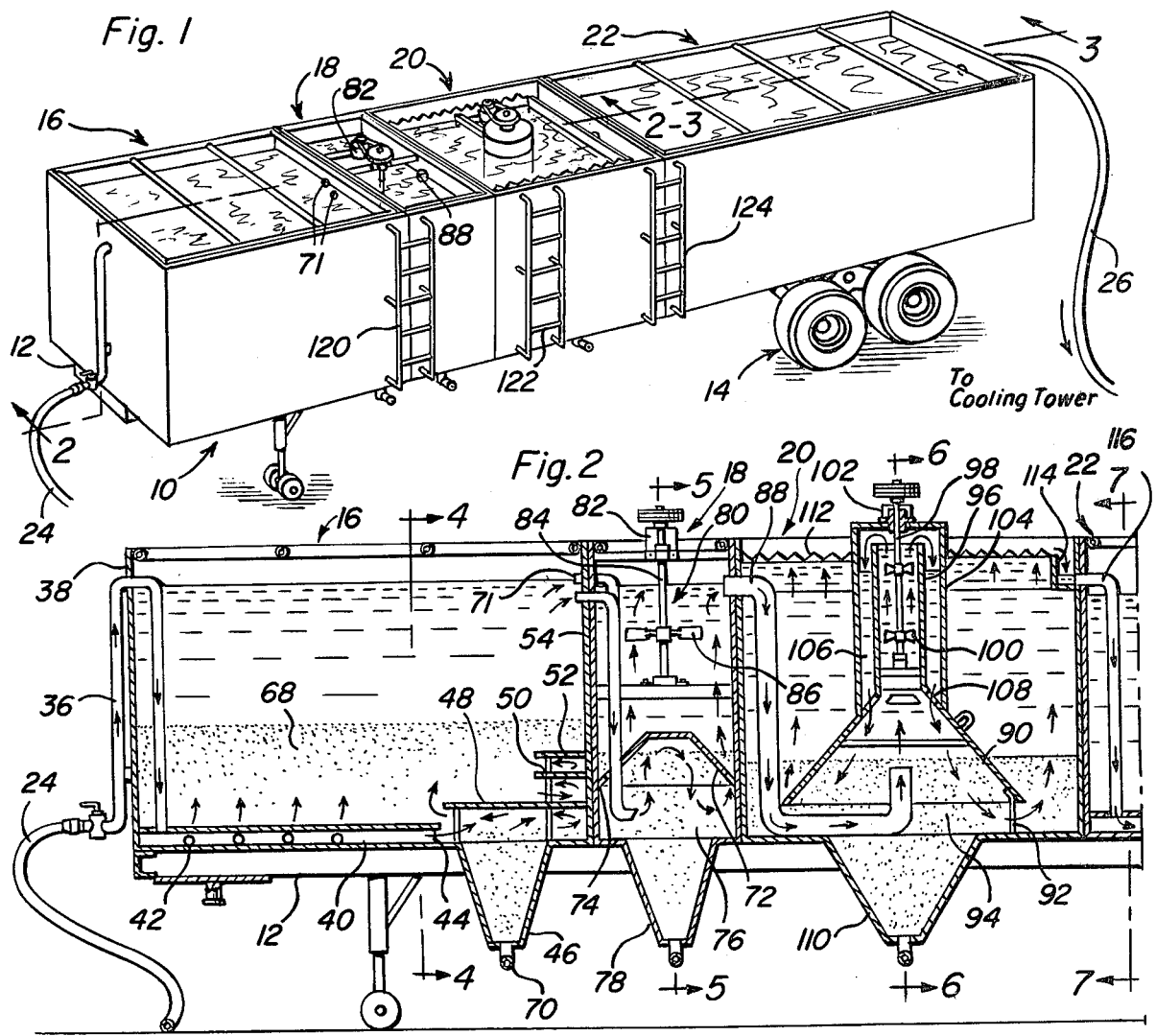
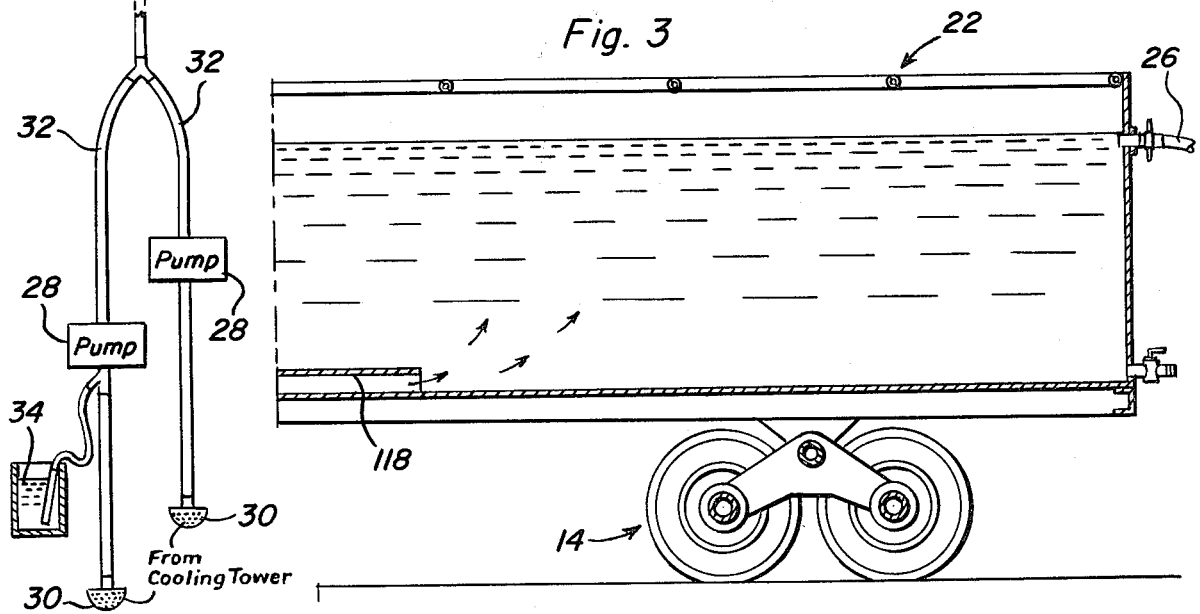

PORTABLE WATER CLARIFIER

BACKGROUND OF THE INVENTION

1. Field of the Invention

This invention relates to water treatment systems and in particular to a portable water clarifier which can be transported to a source of sediment-contaminated water and which is capable of treating the contaminated water to remove sediment therefrom and return clarified water to the source.

The portable water clarifier of the present invention has particular use in removing sediment collected in the basin of industrial cooling towers. Cooling towers are commonly located in industrial process plants and refineries throughout the country and range in size from one cell cooling towers to those which contain a plurality of attached cells. Cooling towers provide a source of cool water for use in removing process heat from the plants or refineries. Cooling towers are designed to draw air into the cooling tower, contacting and cooling the heated water running into the basin of the tower. Dirt and dust carried with the ambient air into the cooling tower settles in the basin contaminating the cooling water. This sediment must be removed periodically so that the cooling water will efficiently remove process heat. Previous methods of cleaning cooling tower basins do not return water which has been removed from the cooling tower during removal of the sediment and clarified to the cooling tower. Typically such methods include pumping the sediment from the basin of the cooling tower directly into a nearby trench; pulling sediment and water by vacuum directly into a vacuum truck; draining the cooling tower and removing the sediment that remains by vacuum truck or other removing means. Such operations do not operate continuously to return water to the cooling tower while removing sediment and thereby result in excessive losses of water or involve shutting the cooling tower down, resulting in loss of production time.

2. Disclosure Statement

Water treatment systems have been proposed in the past utilizing a plurality of treatment steps to remove the contaminants. These prior art systems generally have been cumbersome and time-consuming and are not capable of removing large quantities of sediment from industrial size basins and yet be portable. Several patents which disclose waste water treatment facilities which comprise a plurality of treatment stages include U.S. Pat. No. 4,008,159, issued Feb. 15, 1977, and U.S. Pat. No. 1,160,918, issued Nov. 16, 1915. These two patents, while disclosing multi-stage treatment, do not disclose the specific structure by which the present invention removes sediment and produces a clarified water product which is returned to its source. U.S. Pat. No. 3,992,300, issued Nov. 16, 1976, discloses a multi-stage apparatus for controlling iron content of a zinc phosphating bath. U.S. Pat. No. 2,620,926, issued Dec. 9, 1952, discloses a multi-stage apparatus for treating liquids with activated carbon. U.S. Pat. Nos. 2,753,877, issued July 10, 1956 and 2,365,293, issued Dec. 19, 1944, disclose single-stage water treating apparatus in which the contaminated water is passed over baffles and the like in a tortuous path in order to separate the solid matter from the water. U.S. Pat. No. 3,920,552, issued Nov. 18, 1975, discloses a portable water treatment system comprising a mixing tank having means for drawing ambient water from a nearby lake, stream or river for selectively introducing air or chemicals into the water and for thoroughly mixing the water and any air or chemicals so introduced to treat the water. The treated water is then returned to its source. The mixing tank of this patent is a single-stage and is unlike the multi-stage water clarifier of the present invention.

SUMMARY OF THE INVENTION

In accordance with the present invention, a water clarifier is provided which can be transported and stationed at or near an industrial basin which contains sediment that has settled to the bottom and must be removed. The portable water clarifier can be successfully used to remove sediment from cooling tower basins, aerator basins, pump house basins, and like structures, which contain sediment that has settled and must be removed. The portable water clarifier removes the sediment from basin, clarifies the water that has been extracted from the basin along with the sediment and returns the clarified water to the basin while allowing the full operation of the cooling tower or like structure to continue.

The portable water clarifier of the present invention comprises four sequentially aligned compartments or stages positioned on an easily transportable vehicle allowing the clarifier to be transported where needed. In the first two stages, sediment is separated from the water and settles in sumps located below each of the two stages, the mixture of water and sediment being directed into a tortuous path to facilitate settlement of the sediment to form a sediment bed and water flow path through the formed bed of sediment. Water leaving the second stage is passed to a water clarification stage where again a tortuous path separates the sediment from the water, produces a water flow path through the sediment bed and allows filtered water to rise to the top of the third stage. Filtered water flows over a weir enclosing the third stage and then into a pipe for passage into a fourth stage which comprises an elongated tank whereby the velocity of the water is greatly reduced before leaving the top of the tank free of sediment at the end opposite the entrance point. Located underneath the clarification stage is a third sump for the collection of separated sediment.

In operation, a hose or a plurality of hoses are inserted in the industrial basin while the basin is in full operation. Sediment is pumped from the basin to the first compartment or stage, the water being sequentially directed from stage-to-stage until leaving the fourth stage free of sediment for return to the basin.

Accordingly, an object of the present invention is to provide an improved water treatment device which is portable and which can treat contaminated water from industrial processing plants.

Another object of the invention is to provide a self-contained, portable water clarifying device which is useful in removing particulate materials which settle in industrial water basins.

Another object of the invention is to provide a portable water clarifying device which can be transported and located near industrial water basins and which can be operated to remove sediment from the basin, separate and clarify the water removed with the sediment and return the clarified water to the basin while maintaining full operation of the basin and eliminating excessive loss of basin water.

Still yet another object of the invention is to provide a portable multi-stage water clarifier to treat contaminated water by removing the particulate materials therefrom in successive stages in which the particulate material settles and is collected from the bottom of the separate stages and a clarified water product is removed from the final stage.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the portable water clarifier of the present invention positioned on a flat bed trailer.

FIG. 2 is a longitudinal sectional view of the first three stages of the portable water clarifier taken generally along the line 2—2 of FIG. 1.

FIG. 3 is a longitudinal sectional view of the fourth stage of the portable water clarifier taken generally along the line 3—3 of FIG. 1.

DETAILED DESCRIPTION OF THE INVENTION

Figure 4:
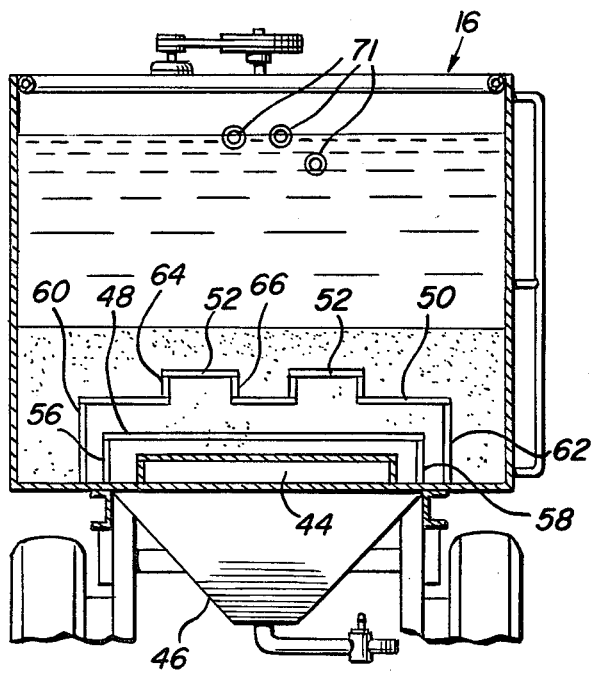
FIG. 4 is a transverse sectional view of the first stage of the portable water clarifier taken generally along the line 4—4 of FIG. 2.

In FIG. 1, the portable water clarifier of the present invention is generally indicated by reference numeral 10. Clarifier 10 is positioned on a flat bed trailer 12 containing wheels 14 allowing the trailer to be transported by truck, tractor, or the like, to the individual work sites. Clarifier 10 is generally of rectangular shape containing four compartments or stages which comprise a feed and primary sediment settling first stage 16, a sediment settling second stage 18, water clarification third stage 20 and clarified water return fourth stage 22. Sediment which is to be removed from an industrial basin or the like enters water clarifier 10 through inlet hose 24 and passes successively to each stage forming a clarified water supply which is returned to the basin via return return hose 26. Since clarified water is continuously returned to the water source, full operation of the cooling tower or like structure from which the sediment is removed can be maintained.

Figure 5:
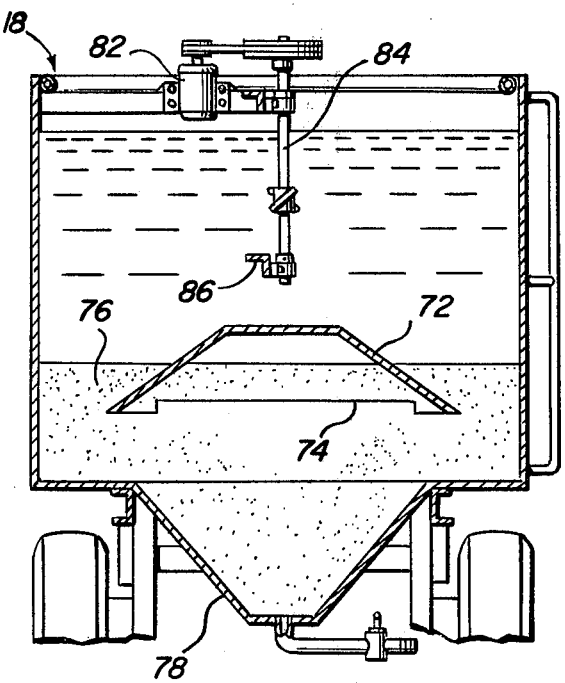
FIG. 5 is a transverse sectional view of the second stage taken generally along the line 5—5 of FIG. 2.
Figure 6:
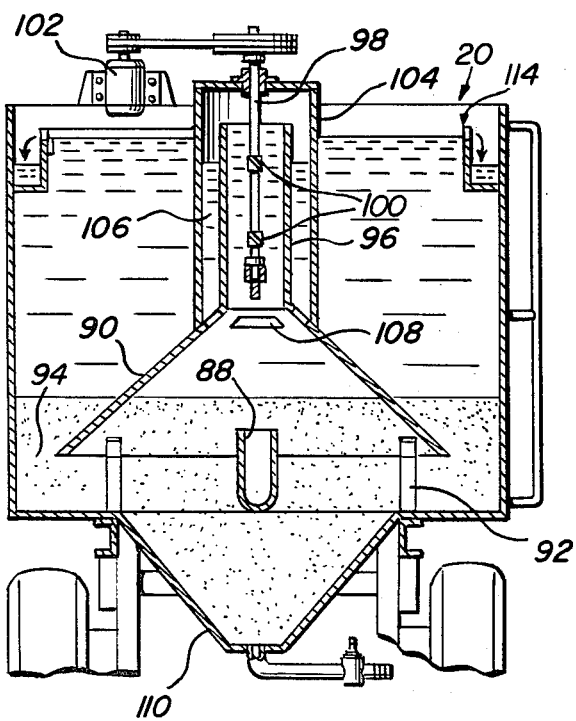
FIG. 6 is a transverse sectional view of the third stage taken generally along the line 6—6 of FIG. 2.
Figure 7:
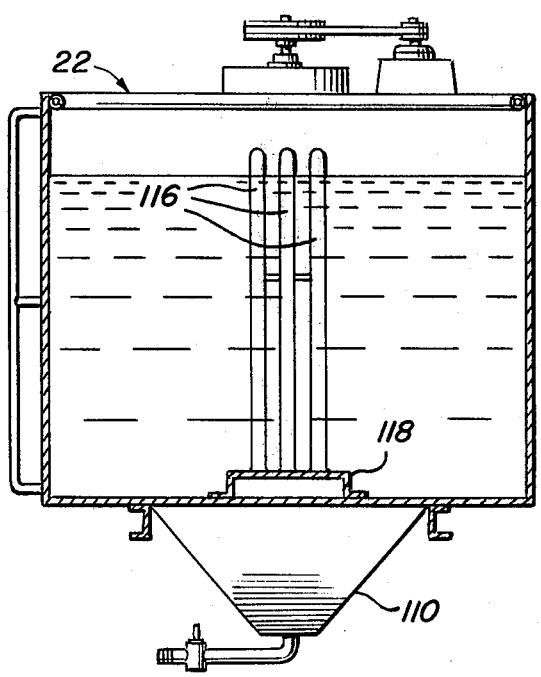
FIG. 7 is a transverse sectional view of the fourth stage stage of the portable water clarifier taken generally along the line 7—7 of FIG. 2.

FIGS. 2 through 7 illustrate the internal structure of each stage of portable water clarifier 10 as well as the movement of water and sediment during passage through each of the successive stages. Sediment from an industrial water storage basin is pumped by high volume vacuum pumps 28 which draw the sediment from the basin through inlets 30 placed in the basin by divers. Pumps 28 move the sediment through discharge hoses 32 which feed inlet hose 24 for passage into water clarifier 10. Placed on the suction side of at least one of the pumps 28 and communicating therewith is a supply 34 of polymer coagulant which flocculates the sediment greatly aiding in the separation of the sediment from the water and the formation of the sediment beds in each stage. Inlet hose 24 feeds feed pipe 36 which directs the sediment up and over end wall 38 of primary sediment settling stage 16. Feed pipe 36 passes down to the bottom of the first stage and directs the sediment into sealed trough 40 resting on the bottom of stage 16. Sediment and water leave trough 40 only through a plurality of small ports 42 placed along the length of trough 40 and through end opening 44 of trough 40. Opening 44 is placed adjacent to and above sump 46 which collects the sediment as it settles. As can be seen from FIGS. 2 and 4, placed adjacent the end of stage 16 opposite end wall 38 are a series of diversion plates 48, 50 and 52 which cause the sediment to roll over and around the plates and which greatly decrease the velocity of the sediment leaving trough 40. Diversion plates 48, 50 and 52 are welded to rear wall 54 of stage 16. Each plate is provided with support legs including legs 56 and 58 for diversion plate 48, legs 60 and 62 for supporting diversion plate 50 and leg pairs 64 and 66 which support diversion plate 52 formed as a spaced pair of diversion plates. Due to the action of the chemical flocculating agent and movement over, under and around the diversion plates, the sediment separates from the water content and settles on the bottom of stage 16 to form a sediment bed 68 which assists in filtering the water by removing sediment entering stage 16 through ports 42. The sediment collected in sump 46 can be removed by a vacuum pump associated with outlet 70.

Placed adjacent the top of stage 16 and through the rear wall 54 and into sediment settling second stage 18 are three overflow pipes 71 which allow passage of filtered water from the top of stage 16 into and adjacent the bottom of stage 18. Placed in stage 18 is inverted cone 72 extending the entire length of stage 18 and including a pair of openings 74 placed on each end thereof. Water and sediment entering stage 18 through pipes 71 flow underneath and against the under surfaces of inverted cone 72 causing further mixing and coagulation of the sediment to form a sediment bed 76 which further attracts sediment from the water passing from stage 16. The sediment which settles can be collected and removed from sump 78 in a manner equivalent to that described for sump 70 in stage 16. Treated water filters through sediment bed 76, and through openings 74 in inverted cone 72 to the top of second stage 18. In the event sediment bed 76 is disturbed causing sediment particles to move above inverted cone 72, a flocculator 80 is provided in stage 18 above the sediment bed. Flocculator 80 comprises a motor 82 which rotates shaft 84 and attached paddles 86 causing the sediment particles to mix and flocculate, the larger and heavier agglomerated particles settling back into sediment bed 76.

Filtered water leaves the top of stage 18 through overflow pipe 88 for passage into clarification stage 20. Clarification stage 20 contains an inverted cone 90 containing openings 92 adjacent the bottom of stage 20 to allow filtered water to pass to the top of the compartment. Pipe 88 provides passage of filtered water from stage 18 to a point underneath inverted cone 90 below sediment bed 94 and into clarifier pipe 96 attached to the top of inverted cone 90. A shaft 98 inserted in the center of pipe 96 contains two propellers 100 which are rotated by rotation of shaft 98 through motor 102. Propellers 100 force sediment and water up to the top of pipe 96 whereupon the water spills over the top and into pipe 104 enclosing pipe 96. The water flows into annular space 106 between pipes 96 and 104 and into openings 108 formed through inverted cone 90. Water continues to pass through sediment bed 94 and through openings 92 at the bottom of cone 90, up through bed 94 once again and to the top of the clarification compartment or stage 20. The sediment forming sediment bed 94 is collected and removed from sump 110 in the manner previously described. Placed on both sides and the rear of clarification stage 20 are weirs 112 spaced from the walls of the chamber to form a three-sided trough 114. Clarified water rising to the top of clarification stage 20 passes over weirs 112 and into trough 114 and into spill-over pipes 116 placed at the rear of stage 20 and in communication with trough 114. Clarified water is directed from pipes 116 below plate 118 spaced from the bottom of clarified water return stage 22. Return stage 22 is the longest stage and is used to store the clarified water leaving clarification stage 20 for return to the water basin from which the sediment was removed. Due to the length of return stage 22, the velocity of the water passing from underneath plate 118 is greatly reduced causing any remaining particles to settle toward the bottom. Return hose 26 is secured adjacent the top of return stage 22.

Except for high volume vacuum pumps 28, flow of water through the successive stages is accomplished by gravity. Accordingly, the outlet or overflow pipes for each stage must be positioned so as to provide constant flow of water from stage 16 through return stage 22. If desired, it is possible to include small pumps between each stage to provide the required flow of water. Ladders 120, 122 and 124 are provided on the side of portable water clarifier 10 to allow access to the interior portion of each stage for maintenance or replacement of components, if needed.

While relative sizes of the various pipes can vary, a preferred range of sizes are as follows: pipes 36, 70 and 116 are preferably about three inches in diameter. Pipe 88 from stage 18 to clarification stage 20 is six inches in diameter. Pipe 96 is ten inches and is enclosed by pipe 104 which has a diameter of 18 inches. Portable water clarifier 10 is preferably situated on a 40 foot flat bed trailer 12 and is approximately six feet high.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A portable water clarifier for removing sediment from water, said clarifier mounted on an easily transportable vehicle, said clarifier comprising a plurality of successive sediment settling stages and a clarified water return stage communicating with one of said stages, each of said stages comprising a sediment bed positioned on the bottom of said tank and a filtered water storage portion positioned above said sediment bed, each of said stages including means to provide flow of water from adjacent the bottom of said stages through said sediment bed, means positioned adjacent the top of said stage and said water storage portion to direct water into the next stage, sump means positioned below each sediment bed to collect sediment and means connected to said sump for removal of sediment from each stage, an inlet means communicating with a source of contaminated water for allowing passsage of said contaminated water to the first of said stages and an outlet means associated with said source for returning clarified water from the last of said stages, at least one of said stages including means to change the direction of flow of water through said sediment bed, said return stage containing an inlet placed on the bottom thereof communicating with the water storage portion adjacent the top of said last stage, said last stage including an inlet means directing water from a previous stage into a conduit positioned in said water storage portion, said conduit being enclosed by a large diameter pipe to form an annular space between the outer surface of said conduit and the inner surface of said pipe, said pipe being associated with said means to change the direction of the flow of water in said sediment bed whereby water from said inlet means is capable of passing through said conduit means into said annular space and in contact with said means to change the direction of flow.

2. The water clarifier of claim 1 wherein each of said sediment settling stages includes means to change the direction of water flow through said sediment bed.

3. The water clarifier of claim 1 wherein said last sediment settling stage further includes means to change the direction of flow of water in said water storage portion.

4. The water clarifier of claim 1 wherein said conduit means includes means to force the flow of water from said inlet means into said annular space.

5. The water clarifier of claim 4 wherein said mdeans to change the direction of flow of water in said sediment bed contained in said last stage comprises an inverted cone placed over said inlet and being positioned within said sediment bed and extending into said water storage portion, said conduit being positioned at the top of said cone and communicating with the interior thereof, said cone including openings therethrough adjacent the top communicating with said annular space, the base of said cone containing openings in said sediment bed allowing water passing into said cone from said annular space to pass through said sediment bed and around said cone into said water storage portion.

6. The water clarifier of claim 5 comprising three of said sediment settling stages and said return stage.

7. A portable water clarifier for removing sediment from water, said clarifier mounted on an easily transportable vehicle, said clarifier comprising a plurality of at least three successive sediment settling stages and at least one clarified water return stage communicating with a latter stage of said at least three stages, each of said at least three stages comprising a sediment bed positioned on the bottom of said tank and a filtered water storage portion positioned above said sediment bed, each of said at least three stages including means to provide flow of water from adjacent the bottom of said stages through said sediment bed, means positioned adjacent the top of said stage and said water storage portion to direct water into the next stage, sump means positioned below each sediment bed to collect sediment and means connected to said sump for removal of sediment from each stage, an inlet means communicating with a source of contaminated water for allowing passage of said contaminated water to the first of said at least three stages and an outlet means associated with said source for returning clarified water from the last of said stages, each of said at least three stages including means to change the direction of water flow through said sediment bed, said return stage containing an inlet placed on the bottom thereof communicating with the water storage portion adjacent the top of said latter stage, said latter stage further including means to change the direction of flow of water in said water storage portion, said latter stage including an inlet means directing water from a previous stage into a conduit positioned in said water storage portion, said conduit being enclosed by a large diameter pipe to form an annular space between the outer surface of said conduit and the inner surface of said pipe, each pipe being associated with said means to change the direction of flow of water in said sediment bed whereby water from said inlet means is capable of passing through said conduit means into said annular space and in contact with said means to change the direction of flow, said conduit means including means to force the flow of water from said inlet means into said annular space, said means to change the direction of flow of water in said sediment bed contained in said latter stage comprising an inverted cone placed over said inlet and being positioned within said sediment bed and extending into said water storage portion, said conduit being positioned at the top of said cone and communicating with the interior thereof, said cone including openings therethrough adjacent the top for communicating with said annular space, the base of said cone containing openings in said sediment bed allowing water passing into said cone from said annular space to pass through said sediment bed and around said cone into said water storage portion, said first of said at least three stages comprising a trough placed at the bottom thereof communicating with said sediment inlet, said trough including openings therein to allow sediment to flow from said trough into said sediment bed, said first stage comprising a rear wall separating said first stage and the second stage, said rear wall containing a plurality of spaced plates extending into said sediment bed whereby the flow of sediment from said trough is capable of passing in, out and around each of said plates within said sediment bed.

8. The water clarifier of claim 7 wherein said means to change the direction of flow of water in said second stage comprises an inverted cone positioned over said sediment bed and extending substantially across the entire length of said second stage whereby the flow of water must flow around said cone.

9. The water clarifier of claim 8 wherein said latter stage comprises a trough positioned adjacent said water storage portion and a weir means allowing water to pass from said water storage portion into said trough, said trough including said means to direct clarified water from said latter stage to said claified water return stage.

* * * * *